UNITED STATES PATENT OFFICE.

JOHN JOCHUM AND RICHARD HERRMANN, OF BROOKLYN, NEW YORK.

IMPROVEMENT IN ORNAMENTING GLASS WITH GOLD, SILVER, OR OTHER METALS.

Specification forming part of Letters Patent No. 203,838, dated May 21, 1878; application filed January 7, 1878.

*To all whom it may concern:*

Be it known that we, JOHN JOCHUM and RICHARD HERRMANN, both parties of the city of Brooklyn, county of Kings, and State of New York, have jointly invented a new and useful process for the formation of letters, figures, and designs in burnished gold, silver, or other metals upon glass; and we hereby declare that the following is a full, clear, and exact description thereof, which will enable others skilled in the arts to make, use, and apply the same, reference being had to the following explanations.

In the ordinary method letters, &c., are formed by applying a "backing" of varnish, or any suitable material, by hand, with a brush, upon the gold, silver, or other metal which has been applied to the glass. When the backing has become dry, the superfluous gold, silver, or other metal is removed by moistening the same and rubbing it off with a chamois-skin, or some other suitable material, while the gold, silver, or other metal which has been covered by the backing material remains firmly secured to the glass.

The length of time required by this method to form each letter and design separately with the backing material upon the gilding has led to various attempts to save time and labor when repetitions of the same design are required by engraving said letters and designs upon stone, zinc, copper, or any suitable substance and applying the backing material thereto, then printing them upon paper and transferring them to the gilding; but, so far as we are aware, said printing was done directly upon and in actual contact with the paper. This method is objectionable, for the reason that the printed films by actual contact become embedded upon and incorporated with the paper, and therefore adhere so firmly thereto as to require the application of sufficient water to the paper, after it has been applied to the gilding, to macerate or disintegrate the paper, in order to separate it in pulpy fragments from the films, whereby said films and the gilding become water-soaked to such an extent as to distort the films and to detach the gilding beneath them, both of which are thereby rendered liable to be washed away with the paper fragments.

Our improvement consists in coating the paper with starch or its equivalent before printing the letters and designs thereupon, for the purpose of preventing direct contact between the printed films and the paper. This transfer print is then applied to the gilding, and requires to be but slightly dampened in order to soften the starch between the films and the paper, which latter is then pulled off in a continuous sheet, leaving the printed films intact and comparatively dry upon the gilding, without distorting them or loosening the gilding from the glass, thus obviating the difficulties which exist in the method heretofore referred to. The superfluous gilding is then removed in the usual manner.

We do not claim, broadly, the invention of forming letters and designs in gold, silver, metal, or colors upon glass by transfer; nor do we claim to be the inventors of starched or prepared paper for transferring purposes; but We do claim as our invention, and desire to secure the same by Letters Patent—

The application of starched or prepared paper in the process of forming letters, words, figures, and designs upon glass, when used in combination with burnished gold, silver, or metal upon the back of the glass, substantially as and for the purposes specified.

JOHN JOCHUM.
RICHARD HERRMANN.

Witnesses:
THOMAS SMITH,
HENRY PARIS.